United States Patent
Lin

(10) Patent No.: US 10,612,720 B2
(45) Date of Patent: Apr. 7, 2020

(54) TRIPOD ASSEMBLY

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 15 days.

(21) Appl. No.: 16/171,669

(22) Filed: Oct. 26, 2018

(65) Prior Publication Data

US 2019/0128471 A1   May 2, 2019

(30) Foreign Application Priority Data

Oct. 27, 2017  (CN) .................... 2017 2 1400415 U

(51) Int. Cl.
| | |
|---|---|
| *F16M 11/24* | (2006.01) |
| *G03B 17/56* | (2006.01) |
| *F16M 11/28* | (2006.01) |
| *F16M 11/16* | (2006.01) |

(52) U.S. Cl.
CPC ........... *F16M 11/245* (2013.01); *F16M 11/16* (2013.01); *F16M 11/28* (2013.01); *G03B 17/561* (2013.01); *F16M 2200/028* (2013.01)

(58) Field of Classification Search
CPC ...... F16M 11/245; F16M 11/16; F16M 11/28; F16M 2200/028; G03B 17/561
See application file for complete search history.

(56) References Cited

U.S. PATENT DOCUMENTS

| | | | | |
|---|---|---|---|---|
| 1,598,007 | A * | 8/1926 | Petrick ................. | F16M 11/245 248/188 |
| 2,493,978 | A * | 1/1950 | Kromer ................... | B66F 13/00 248/171 |
| 5,934,628 | A * | 8/1999 | Bosnakovic ............. | B60Q 7/00 248/169 |
| 2018/0010732 | A1* | 1/2018 | Lin ........................ | F16M 11/26 |

* cited by examiner

*Primary Examiner* — Anita M King
(74) *Attorney, Agent, or Firm* — Lin & Associates Intellectual Property, Inc.

(57) ABSTRACT

A tripod assembly includes a central tube having a first fastener, a lower tripod unit having an opening provided with a second fastener. The central tube is movable between a separated position, in which the first fastener can be spaced apart from the second fastener and a coupled position, in which, the first fastener extends into the opening to permit rotation of the central tube relative to the lower tripod unit in a clockwise direction such that the first and second fasteners engage each other to prevent separation of the central tube from the lower tripod unit, wherein, when the central tube is disposed at the coupled position, rotation of the central tube relative to the lower tripod unit in an anti-clockwise direction results in disengagement of the first and second fasteners to permit movement of the central tube away from the lower tripod unit, thereby disposing the tube at the separated position.

3 Claims, 10 Drawing Sheets

TRIPOD ASSEMBLY

CROSS-REFERENCE TO RELATED APPLICATION

This application claims the priority of Chinese patent application No. 201721400415.3, filed on Oct. 27, 2017, which is incorporated herewith by reference.

BACKGROUND OF THE INVENTION

1. Field of the Invention

The present invention generally relates to a tripod assembly, more particular to a tripod assembly including a lower tripod unit that can be assembled and disassembled by rotation.

2. The Prior Arts

A conventional tripod assembly is a portable three-legged frame or stand, used as a tool for supporting some other object, like a lighting device, a camera, a telescope and a mobile phone. The conventional tripod assembly provides stability to an object and it is often used in a static state. However, in order to fulfill the swift transformation between dynamic and static states. For example, when shooting a moving object, the cam recorder or lighting device needs to be frequently moved, and thus the tripod assembly should be easily transformed to a hand-held structure without a three leg structure. When shooting a static object, the central tube can be swiftly mounted on the tripod assembly, thereby reducing the burden or load on the user.

One currently available tripod assembly generally includes a three-legged frame, a central tube extending through an upper tripod unit to connect with a lower tripod unit, which in turn, is attached to the three-legged frame that needs not be detached from the central tube. When it is desired to use the tripod assembly, a screw is inserted though the lower tripod unit and the central tube to immobilize the two elements relative to each other. When it is desired to detach or disassemble the tripod assembly, a tool must be applied. One disadvantage resulting from usage of the conventional tripod assembly resides in that the user may encounter difficulties in detaching the central tube from the lower tripod unit in case of missing of the tool.

In order to eliminate above-mentioned problem, a screw knob is used instead of the screw to facilitate the user to detach or assemble of the central tube relative the lower tripod unit to which the screw knob is tightened or loosen such that the user only needs to tighten the screw knob on the central tube relative to the lower tripod unit or loosening the screw knob on the central tube relative to the lower tripod unit, thereby securing the central tube relative to the three-legged frame or detaching the central tube from the lower tripod unit. One drawback of such application resides in that frequent tightening and/or loosening of the screw knob relative to the lower tripod unit may result in wearing of the threads on the screw knob and the lower tripod unit, which may finally lead to disengagement of the central tube from the lower tripod unit.

SUMMARY OF THE INVENTION

A primary objective of the present invention is to solve the above-mentioned problems in the prior art, and provide a tripod assembly that includes a central tube and a lower tripod unit receiving the central tube such that the central tube is movable easily between a separated position and a coupled position without the application of a tool and/or a screw knob.

In order to achieve the above-mentioned objective, the present invention provides a tripod assembly including: a central tube; a tube connector attached to one end of the central tube, having a first fastening element; an upper tripod unit defining a central hole; a lower tripod unit having an opening and a second fastening element installed within the opening such that the second fastening element can engage or couple with the first fastening element due to insertion of the central tube through the central hole of the upper tripod unit and into the opening of the lower tripod unit; three support legs, each having an upper end connected pivotally to the upper tripod unit; and at least three braces, each having an outer end portion connected pivotally to a respective one of the support legs and an inner end portion connected pivotally to the lower tripod unit; wherein, the central tube is movable relative to the lower tripod unit between a separated position, in which the first fastening element of the central tube can be spaced apart from the second fastening element of the lower tripod unit and a coupled position, in which, the first fastening element extends into the opening of the lower tripod unit to permit rotation of the central tube relative to the lower tripod unit in a clockwise direction such that the first fastening element engages the second fastening element so as to prevent separation of the central tube from the lower tripod unit, wherein, when the central tube is disposed at the coupled position, rotation of the central tube relative to the lower tripod unit in an anti-clockwise direction opposite to the clockwise direction results in disengagement of the first fastening element from the second fastening element so as to permit movement of the central tube away from the lower tripod unit, thereby disposing the central tube at the separated position.

In one embodiment, the tube connector has an outer peripheral wall formed with three L-shaped fasteners, which cooperatively define the first fastening element and which are spaced from one another at equal angular distance with respect to an axis of the outer peripheral wall so as to define a first reception space between an adjacent pair of the L-shaped fasteners, each of the L-shaped fasteners further defining an entrance. The lower tripod unit has an inner peripheral wall that confines the opening and that is formed with three I-shaped fasteners cooperatively defining the second coupler joint, wherein the three I-shaped fasteners are spaced from one another at equal distance with respect to an axis of the lower tripod unit so as to define a second reception space between an adjacent pair of the I-shaped fasteners for receiving the L-shaped fastener while the first reception space receives a respective one of the I-shaped fasteners such that rotation of the central tube in the clockwise direction relative to the lower tripod unit results in insertion of the I-shaped fastener into the L-shaped fastener via the entrance, thereby engaging the first fastening element with the second fastening element so as to prevent separation of the central tube from the lower tripod unit.

In the above-mentioned embodiment, the I-shaped fastener has a position retaining protrusion at an appropriate position while the L-shaped fastener has a position retaining groove corresponding to the position retaining protrusion such that rotation of the central tube relative to the lower tripod unit in the clockwise direction results in insertion of the I-shaped fastener into the L-shaped fastener, thereby causing mutual engagement between the position retaining protrusion of the I-shaped fastener and the position retaining groove of the L-shaped fastener and enhancing engagement of the central tube relative to the lower tripod unit.

Note that, in the tripod assembly of the present invention, the first fastening element and the second fastening element are installed respectively on the central tube and the lower tripod unit so as to eliminate the application of a screw or a screw knob as in the prior art and since the central tube is movable relative to the lower tripod unit between a separated position and a coupled position by simply rotating the central tube relative to the lower tripod unit in clockwise and anti-clockwise directions, the problems like wearing of screw threads or missing of a detaching tool encountered in the prior art can be avoided. In other words, the tripod assembly of the present invention provides many advantages which prior art fails to provide.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

Figure 1:
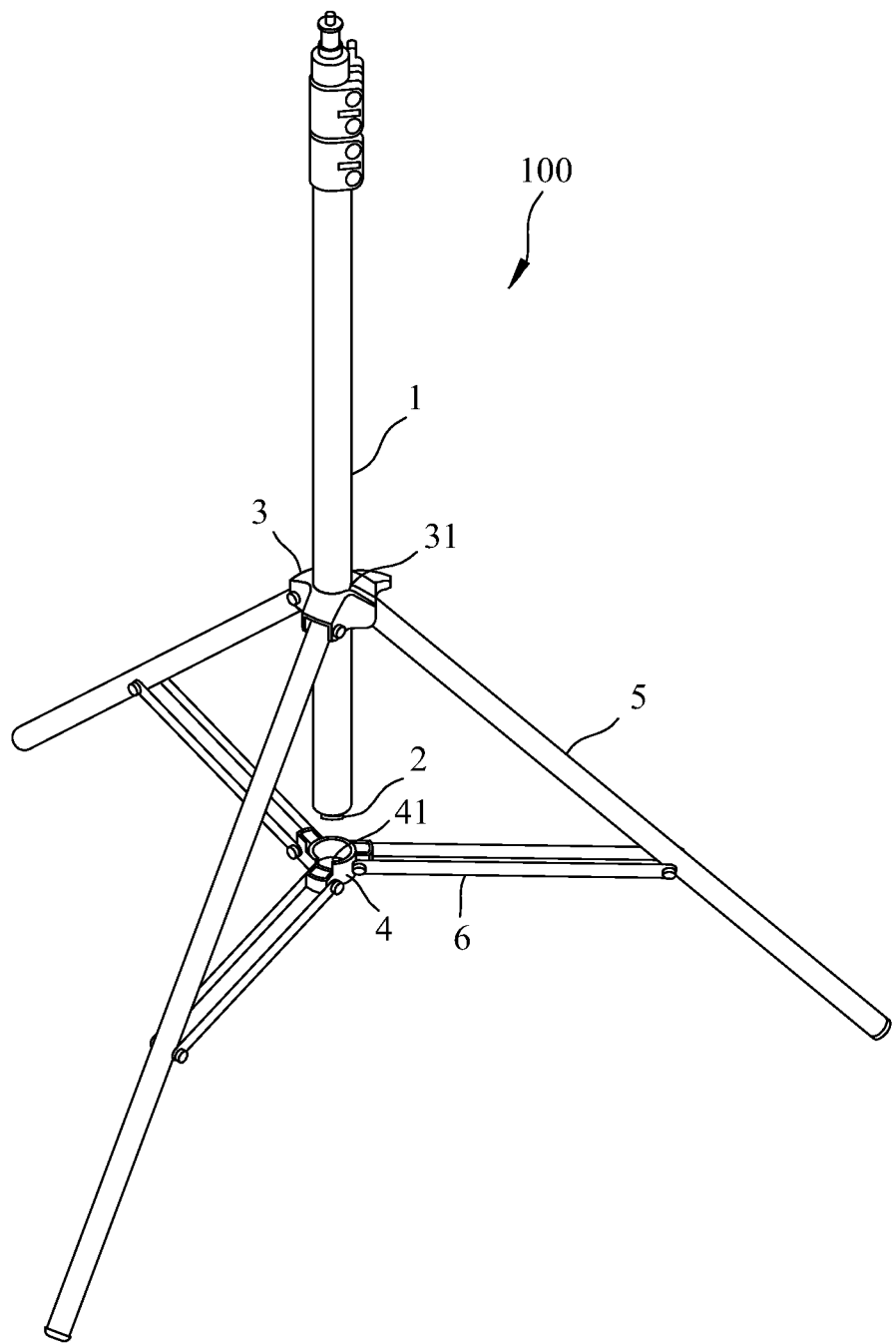
FIG. 1 is a perspective view showing a central tube is disposed at a separated position relative to a lower tripod unit employed in a tripod assembly according to a first embodiment of the present invention.
Figure 2:
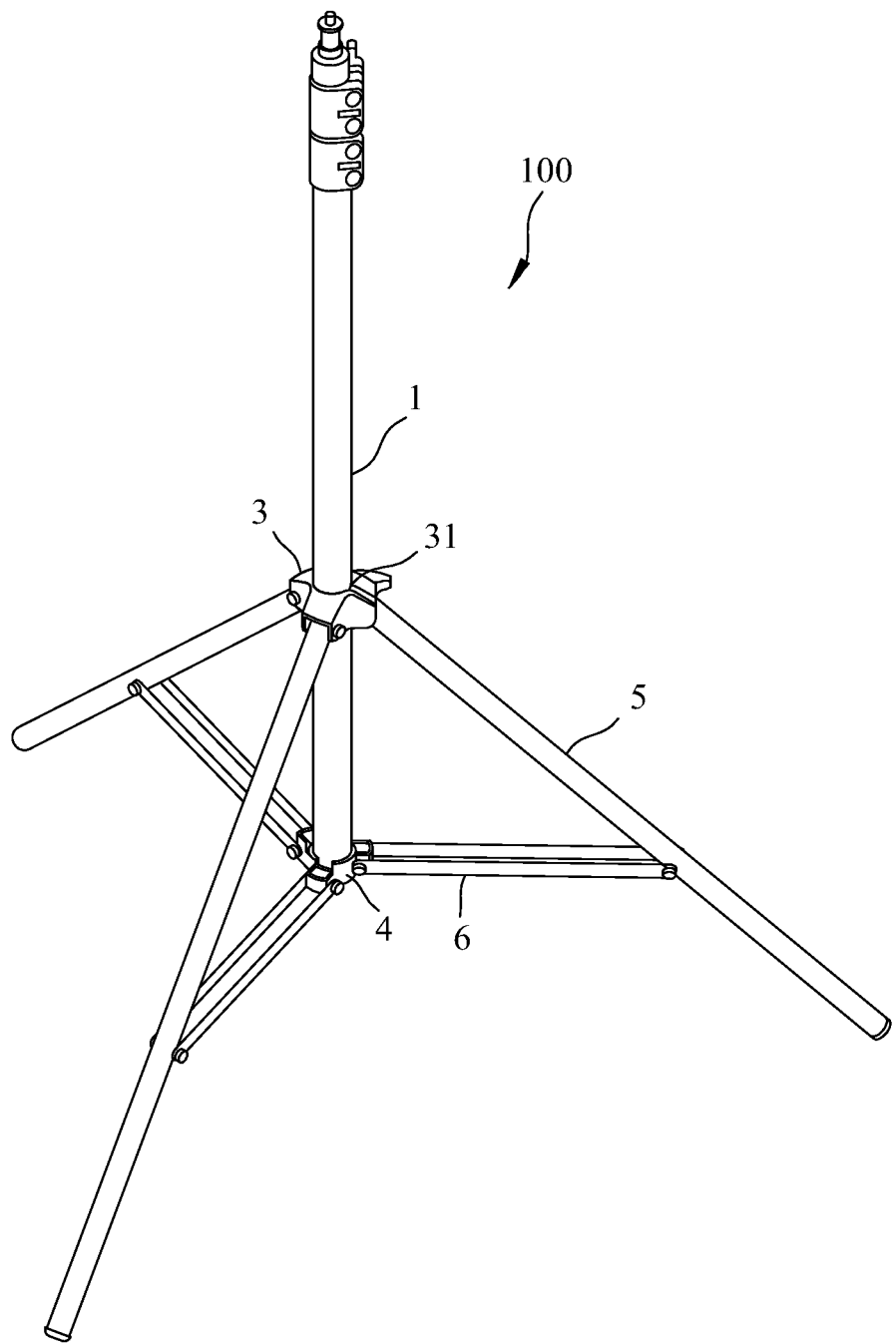
FIG. 2 is a perspective view showing the central tube is disposed at a coupled position relative to the lower tripod unit in the tripod assembly according to the first embodiment of the present invention.

The accompanying drawings are included to provide a further understanding of the invention, and are incorporated in and constitute a part of this specification. The drawings illustrate embodiments of the invention and, together with the description, serve to explain the principles of the invention.

Referring to FIGS. 1-5C, a tripod assembly 100 according to a first embodiment of the present invention includes: a central tube 1; a tube connector 2 attached to an end of the central tube 1, having a first fastening element 21; an upper tripod unit 3 defining a central hole 31; a lower tripod unit 4 having an opening 41 and a second fastening element 42 installed within the opening 41 such that the second fastening element 42 can engage or couple with the first fastening element 21 due to insertion of the central tube 1 through the central hole 31 of the upper tripod unit 3 and into the opening 41 of the lower tripod unit 4; three support legs 5, each having an upper end connected pivotally to the upper tripod unit 3; and at least three braces 6, each having an outer end portion connected pivotally to a respective one of the support legs 5 and an inner end portion connected pivotally to the lower tripod unit 4. In this embodiment, bolts and nuts are used for pivotally connecting the support legs 5 to the upper tripod unit 3, the braces 6 to the support legs 5 and the lower tripod unit 4. Bolt-and-nut is one type of connecting means. Many other connecting means can be utilized so long as they permit pivotal action between the connected elements, therefore the scope thereof should not be limited only thereto.

Figure 4A:
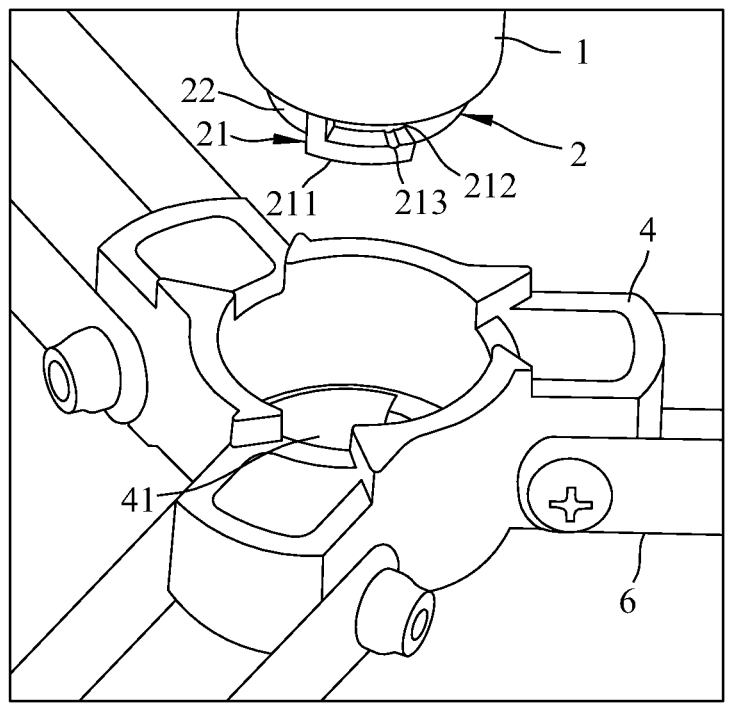
FIG. 4A is an enlarged view illustrating the central tube is disposed at the separated position relative to the lower tripod unit in the tripod assembly according to the first embodiment of the present invention.
Figure 4B:
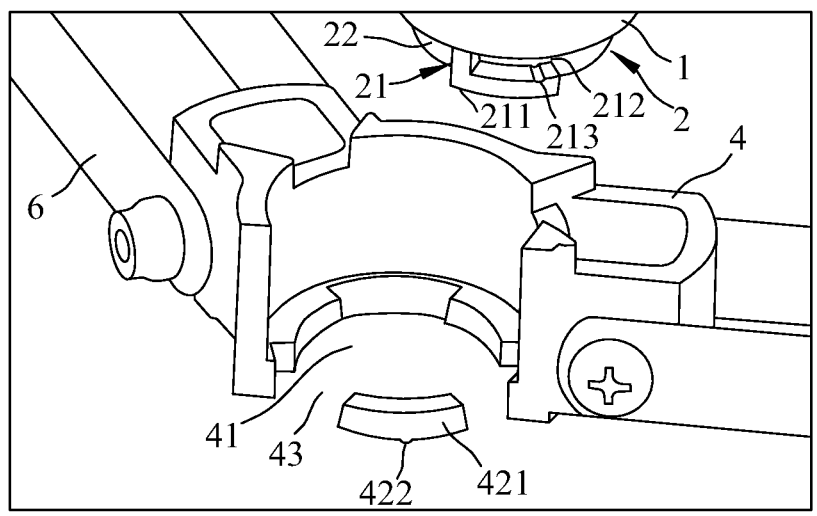
FIG. 4B is a cross-sectional view of the tripod assembly of the present invention in a separated position taken along line A-A.
Figure 5A:
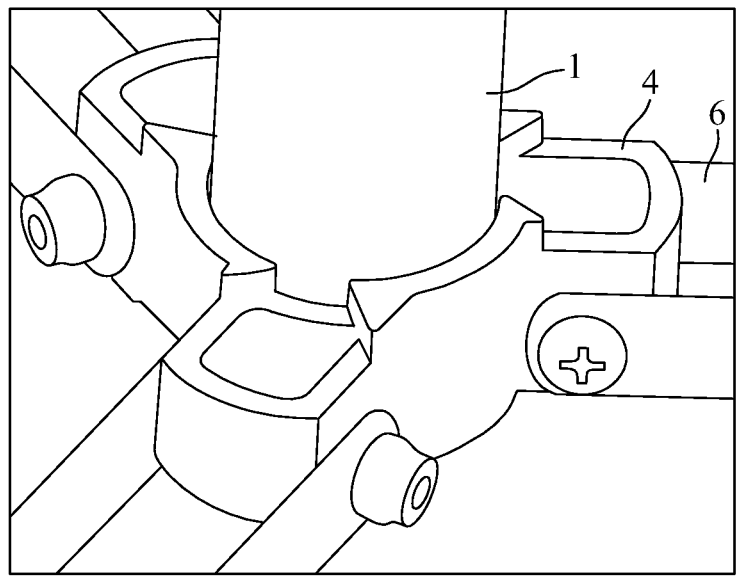
FIG. 5A is an enlarged view illustrating the central tube is disposed at the coupled position relative to the lower tripod unit in the tripod assembly according to the first embodiment of the present invention.
Figure 5B:
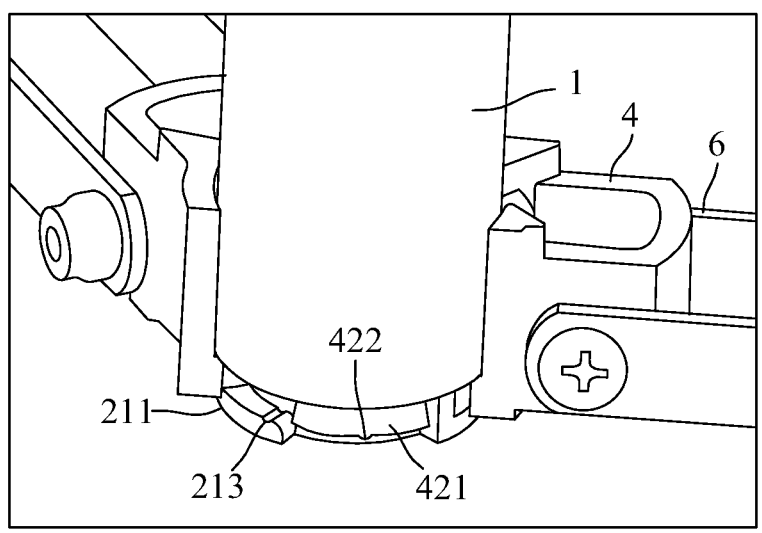
FIG. 5B is an enlarged cross-sectional view of the tripod assembly of the present invention taken along line A-A, illustrating a condition the central tube is not rotated relative to the lower tripod unit.
Figure 5C:
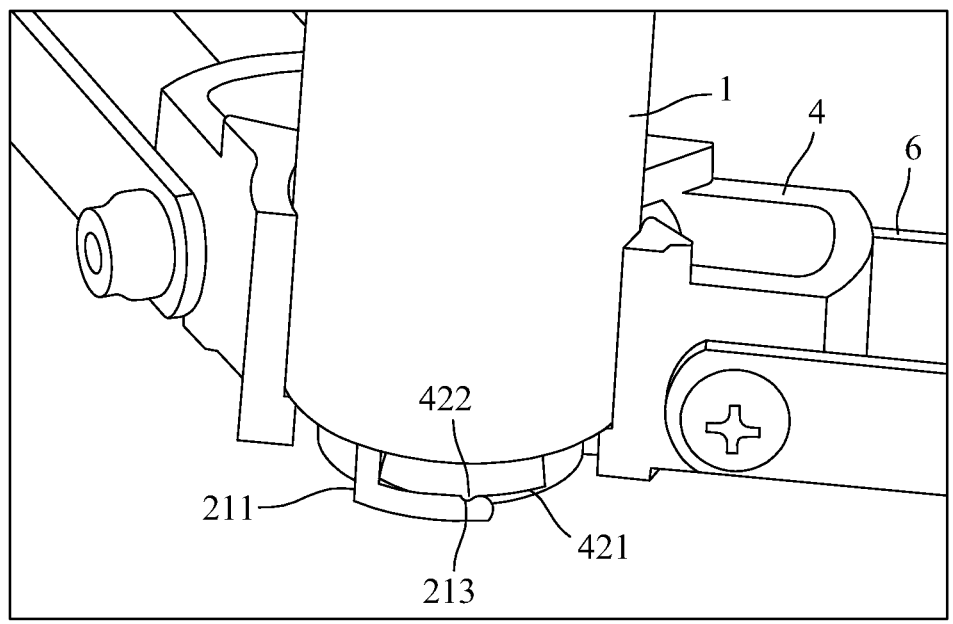
FIG. 5C is an enlarged cross-sectional view of the tripod assembly of the present invention taken along line A-A, illustrating a condition the central tube is already rotated relative to the lower tripod unit.

Referring to FIGS. 1 and 5C, the central tube 1 is movable relative to the lower tripod unit 4 between a separated position, in which the first fastening element 21 of the central tube 1 can be spaced apart or away from the second fastening element 42 of the lower tripod unit 4, as best shown in FIGS. 4A and 4B, and a coupled position, in which, the first fastening element 21 extends into the opening 41 of the lower tripod unit 4, as best shown in FIGS. 5A and 5B, to permit rotation of the central tube 1 relative to the lower tripod unit 4 in a clockwise direction such that the first fastening element 21 of the central tube 1 engages the second fastening element 41 of the lower tripod unit 4, as best shown in FIG. 5C, so as to prevent separation of the central tube 1 from the lower tripod unit 4, wherein, when the central tube 1 is disposed at the coupled position, rotation of the central tube 1 relative to the lower tripod unit 4 in an anti-clockwise direction opposite to the clockwise direction results in disengagement of the first fastening element 21 of the central tube 1 from the second fastening element 41 of the lower tripod unit 4 so as to permit a movement of the central tube 1 away from the lower tripod unit 4, thereby disposing the central tube 1 at the separated position. Note that, the central tube 1 is movable relative to the lower tripod unit 4 between the separated position and the coupled position by simply rotating the central tube 1 relative to the lower tripod unit 4 in clockwise and anti-clockwise directions, the problems like wearing of screw threads or missing of a detaching tool encountered in the prior art can be avoided. In other words, the tripod assembly of the present invention provides many advantages which prior art fails to provide.

Referring to FIGS. 3A to 5C, the tube connector 2 preferably has an outer peripheral wall surrounded with three L-shaped fasteners 211, which cooperatively define the first fastening element 21 and which are spaced from one another at equal distance with respect to an axis of the outer peripheral wall so as to define a first reception space 22 between an adjacent pair of the L-shaped fasteners 211. Each of the L-shaped fasteners 211 further defines an entrance 212 (see FIG. 4A). The lower tripod unit 4 preferably has an inner peripheral wall that confines the opening 41 and that is formed with three I-shaped fasteners 421 cooperatively defining the second fastening element 42, wherein the three I-shaped fasteners 421 (see FIG. 4B) are spaced from one another at equal distance with respect to an axis of the lower tripod unit 4 so as to define a second reception space 43 between an adjacent pair of the I-shaped fasteners 421 such that when the central tube 1 is disposed at the separation position, where the first fastening element 21 of the tube connector 2 is spaced apart from the second fastening element 42 of the lower tripod unit 4 (see FIGS. 4A and 4B). In other words, the first and second fastening elements 21, 42 are spaced apart from each other so that they cannot engage each other. When the lower end of the central tube 1 is inserted into the opening 41 of the lower tripod unit 4, as shown in FIGS. 5A and 5B, the L-shaped fastener 211 of the first fastening element 21 extends into the second reception space 43 in the lower tripod unit 4 while the first reception space 22 between adjacent pair of the L-shaped fastener 211 receives a respective one of the I-shaped fasteners 421 such that rotation of the central tube 1 in the clockwise direction relative to the lower tripod unit 4 results in insertion of the I-shaped fastener 421 into the L-shaped fastener 211 via the entrance 212 (see FIG. 5C), thereby engaging the first fastening element 21 of the central tube 1 with the second fastening element 41 of the lower tripod unit 4 so as to prevent separation of the central tube 1 from the lower tripod unit 4. In other words, the central tube 1 is disposed at the coupled position relative the lower tripod unit 4. In the same manner, when the central tube 1 is disposed at the coupled position relative the lower tripod unit 4 and when it is desired to move the central tube 1 to the separated position, rotation of the central tube 1 relative to the lower tripod unit 4 in an anti-clockwise direction opposite to the clockwise direction results in removal of the I-shaped fastener 421 out of the L-shaped fastener 211 via the entrance 212, which in turn, results in disengagement of the first fastening element 21 from the second fastening element 41 so as to permit movement of the central tube 1 away from the lower tripod unit 4. In other words, the central tube 1 is disposed at the separated position relative to the lower tripod unit 4 at this time.

Referring to FIGS. 4A to 5C, the I-shaped fastener 421 has a position retaining protrusion 422 at an appropriate position while the L-shaped fastener 211 has a position retaining groove 213 corresponding to the position retaining protrusion 422 such that rotation of the central tube 1 relative to the lower tripod unit 4 in the clockwise direction results in insertion of the I-shaped fastener 421 into the L-shaped fastener 211, thereby causing mutual engagement between the position retaining protrusion 422 of the I-shaped fastener 421 and the position retaining groove 213 of the L-shaped fastener 211 and enhancing engagement of the central tube 1 relative to the lower tripod unit 4 when the central tube 1 is disposed at the coupled position relative to the lower tripod unit 4. One aspect to note is that due to presence of the positioning groove 213 and the position retaining protrusion 422, the user may feel a sort of retarding force or damping action during rotation of the central tube 1 relative to the lower tripod unit 4 either in the clockwise or the anti-clockwise directions, which means that the user can know the first fastening element 21 is fully engaged with the second fastening element 42 when the central tube 1 is disposed at the coupled position or the first fastening element 21 is fully disengaged from the second fastening element 42 such that the central tube 1 can be moved away from the lower tripod unit 4 at this moment if he or she desires so.

Figure 6A:
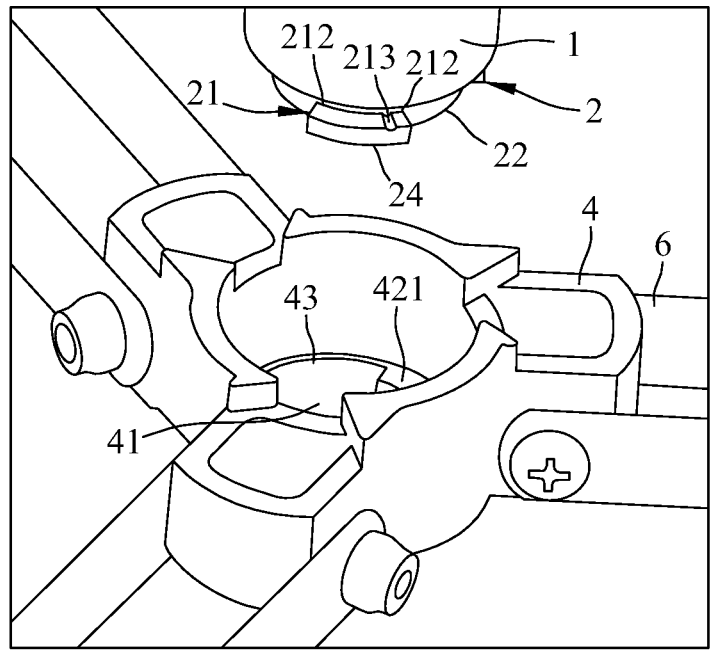
FIG. 6A is an enlarged and fragmentary view illustrating the central tube is disposed at the separated position relative to the lower tripod unit in the tripod assembly according to a second embodiment of the present invention.
Figure 6B:
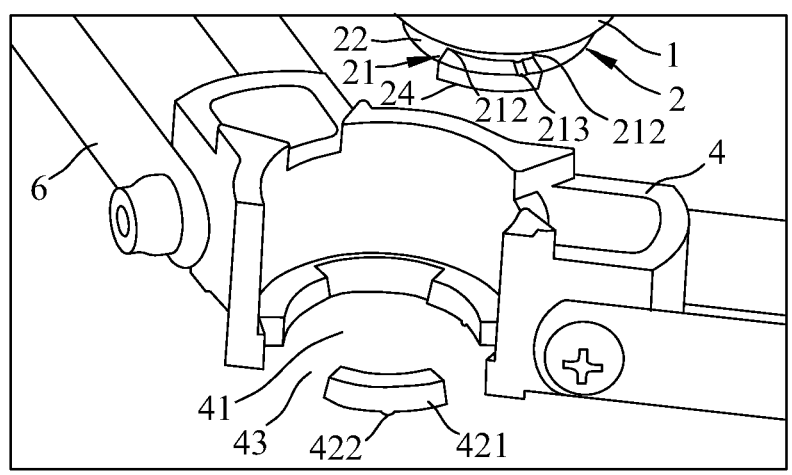
FIG. 6B is an enlarged and fragmentary cross-sectional view of the tripod assembly according to the second embodiment of the present invention taken along line A-A, illustrating a condition the central tube is not rotated relative to the lower tripod unit.
Figure 6C:
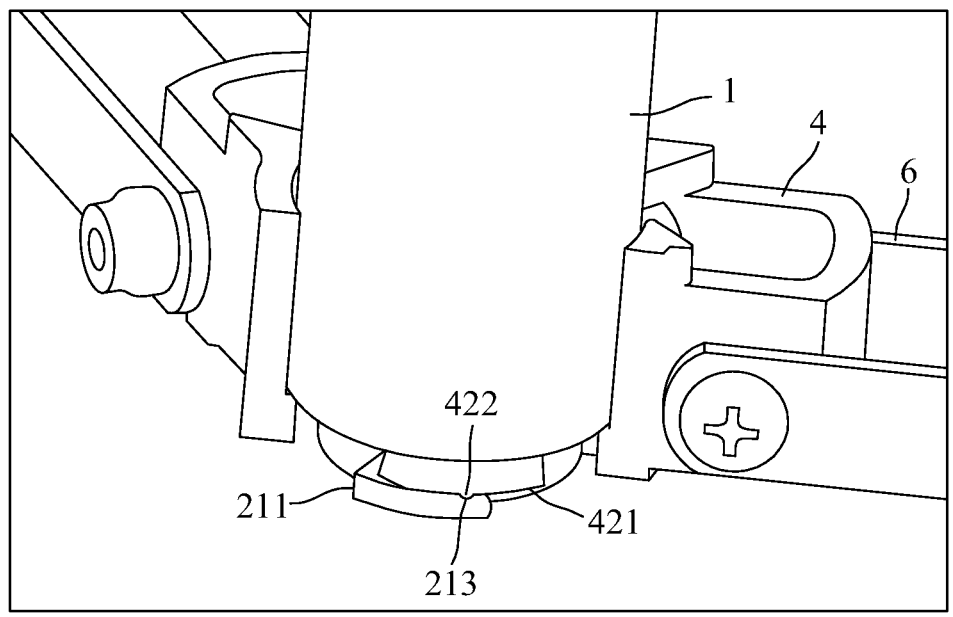
FIG. 6C is an enlarged and fragmentary cross-sectional view of the tripod assembly according to the second embodiment of the present invention taken along line A-A, illustrating a condition the central tube is already rotated relative to the lower tripod unit.

Referring to FIGS. 6A to 6C, a tripod assembly according to a second embodiment of the present invention includes: a central tube 1; a tube connector 2 attached to an end of the central tube 1, having a first fastening element 21 and the other elements having the structures similar to the first embodiment. The only difference resides in that the tube connector 2 preferably has an outer peripheral wall formed with three I-shaped fasteners 24, which cooperatively define the first fastening element 21 and which are spaced from one another at equal angular distance with respect to an axis of the outer peripheral wall so as to define a first reception space 22 between each adjacent pair of the I-shaped fasteners 24. Each of the I-shaped fasteners 24 further defines two lateral entrances 212 (see FIG. 6A). The lower tripod unit 4 preferably has an inner peripheral wall that confines the opening 41 and that is surrounded with three I-shaped fasteners 421 cooperatively defining the second fastening element 42, wherein the three I-shaped fasteners 421 of the lower tripod unit 4 (see FIG. 6B) are spaced from one another at equal angular distance with respect to an axis of the lower tripod unit 4 so as to define a second reception space 43 between an adjacent pair of the I-shaped fasteners 421. The I-shaped fastener 421 has a position retaining protrusion 422 at an appropriate position while the I-shaped fastener 24 has a position retaining groove 213 corresponding to the position retaining protrusion 422 such that rotation of the central tube 1 relative to the lower tripod unit 4 in the clockwise direction results in insertion of the I-shaped fastener 421 into the I-shaped fastener 24, thereby causing mutual engagement between the position retaining protrusion 422 of the I-shaped fastener 421 and the position retaining groove 213 of the I-shaped fastener 24 and enhancing engagement of the central tube 1 relative to the lower tripod unit 4 when the central tube 1 is disposed at the coupled position relative to the lower tripod unit 4. One aspect to note is that due to presence of the positioning groove 213 and the position retaining protrusion 422, the user may feel a sort of retarding force or damping action during rotation of the central tube 1 relative to the lower tripod unit 4 either in the clockwise or the anti-clockwise directions, which means that the user can know the first fastening element 21 is fully engaged with the second fastening element 42 when the central tube 1 is disposed at the coupled position or the first fastening element 21 is fully disengaged from the second fastening element 42 such that the central tube 1 can be moved away from the lower tripod unit 4. Another aspect to note is that due to presence of two lateral entrances 212 at both sides of the I-shaped fastener 24, the central tube 1 can be rotated freely in any direction (either clockwise or anti-clockwise direction) relative to the lower tripod unit 4 when moving between the separated position and the coupled position.

Figure 7:
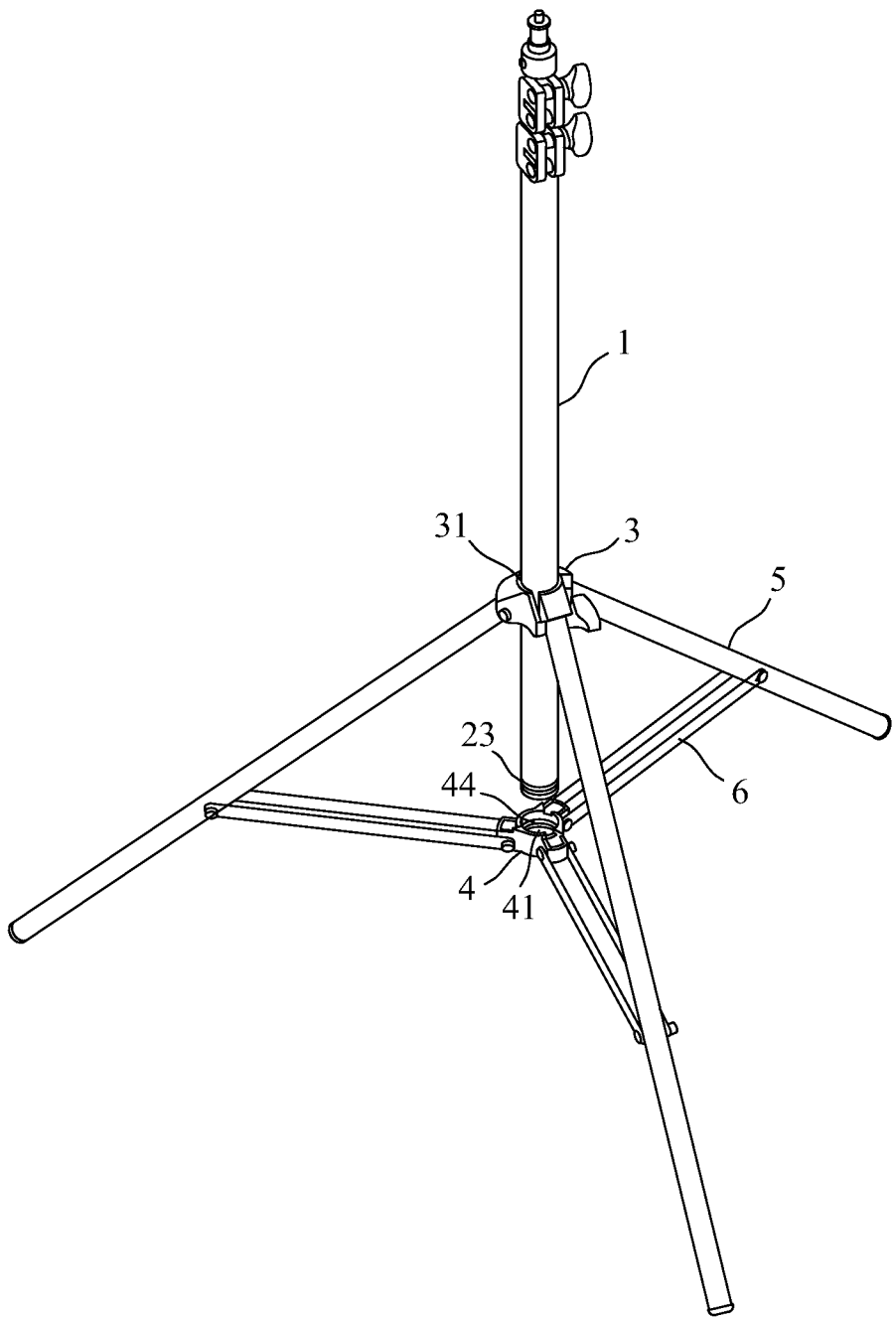
FIG. 7 is a perspective view of a tripod assembly according to a third embodiment of the present invention, illustrating the central tube is disposed at a separated position relative to the lower tripod unit.
Figure 8:
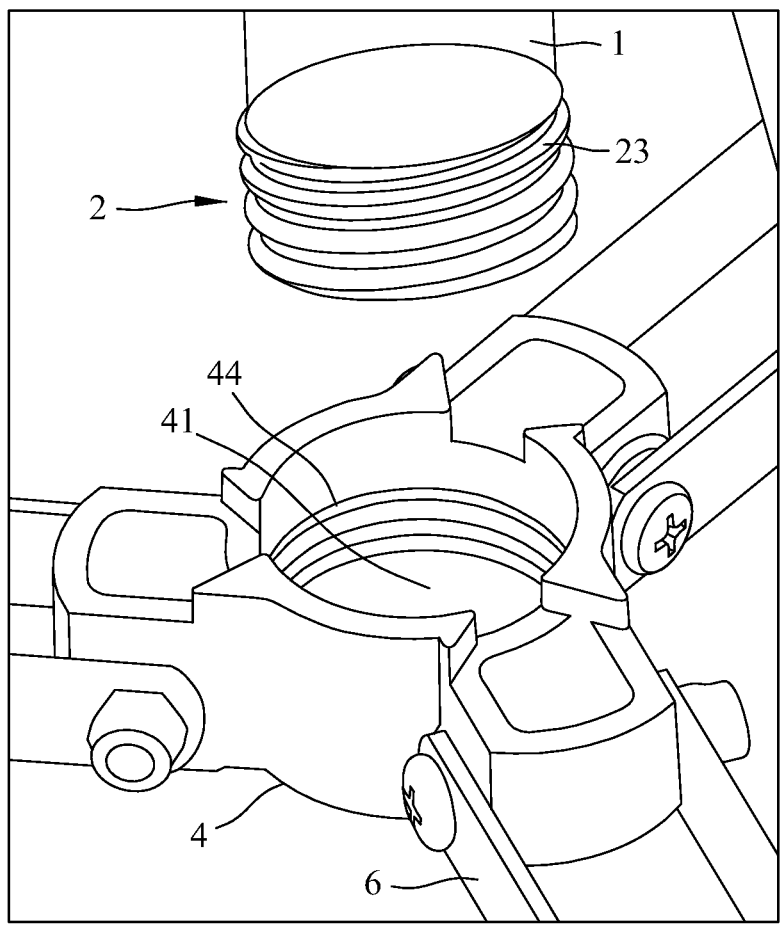
FIG. 8 is an enlarged and fragmentary view of the tripod assembly according to the third embodiment of the present invention, illustrating the central tube is disposed at the separated position relative to the lower tripod unit.

Referring to FIGS. 7 and 8, a tripod assembly according to a third embodiment of the present invention includes all the elements similar to the first embodiment, except in that the first fastening element 21 attached to an end of the central tube 1 is in form of outer threads 23 while the second fastening element 42 installed within the opening 41 of the lower tripod unit 4 is in form of inner threads 44 such that when the central tube 1 is disposed at the coupled position relative to the lower tripod unit 4, the outer and inner threads 23, 44 engage relative to each other due to rotation of the central tube 1 in a clockwise direction relative to the lower tripod unit 4, thereby immobilizing the central tube 1 and the lower tripod unit 4 and rotation of the central tube 1 in an anti-clockwise direction opposite to the clockwise direction relative to the lower tripod unit 4 can result in disengagement between the outer and inner threads 23, 44, after which the central tube 1 can be moved away from and is spaced apart from the lower tripod unit 4. At this condition, the central tube 1 is disposed at the separated position relative to the lower tripod unit 4.

Figure 3A:
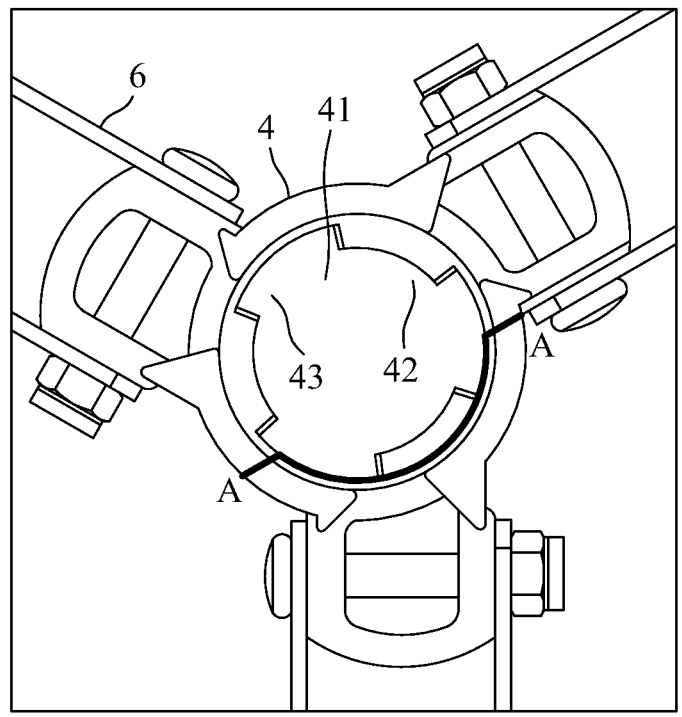
FIG. 3A shows an enlarged bottom view of a lower tripod unit employed in the tripod assembly according to the first embodiment of the present invention.
Figure 3B:
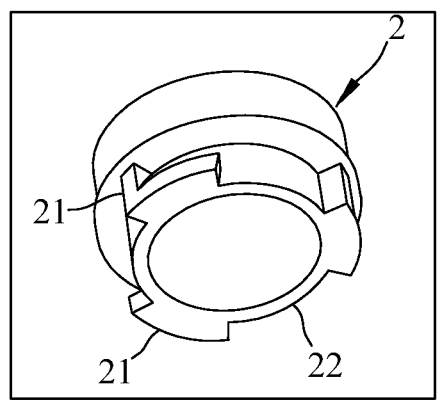
FIG. 3B shows an enlarged view of a tube connector employed in the tripod assembly according to the first embodiment of the present invention.

Preferably, the opening 41 of the lower tripod unit 4 is a through hole, as best shown in FIG. 3A while the central tube 1 can be a telescopically connected tube having a plurality of telescopically connected tubes, as best shown in FIG. 1.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A tripod assembly comprising:
   a central tube;
   a tube connector attached to one end of said central tube, and having a first fastening element;
   an upper tripod unit defining a central hole;
   a lower tripod unit having an opening and a second fastening element installed within said opening such that said second fastening element can engage or couple with said first fastening element due to insertion of said central tube through said central hole of said upper tripod unit and into said opening of said lower tripod unit;
   three support legs, each having an upper end connected pivotally to said upper tripod unit; and
   at least three braces, each having an outer end portion connected pivotally to a respective one of said support legs and an inner end portion connected pivotally to said lower tripod unit;
   wherein, said central tube is movable relative to said lower tripod unit between a separated position, in which said first fastening element of said central tube can be spaced apart from said second fastening element of said lower tripod unit and a coupled position, in which, said first fastening element extends into said opening of said lower tripod unit to permit rotation of said central tube relative to said lower tripod unit in a clockwise direction such that said first fastening element of said central tube engage said second fastening element of said lower tripod unit so as to prevent separation of said central tube from said lower tripod unit, wherein, when said central tube is disposed at said coupled position, rotation of said central tube relative to said lower tripod unit in an anti-clockwise direction results in disengagement of said first fastening element of said central tube from said second fastening element of said lower tripod unit so as to permit movement of said central tube away from said lower tripod unit, thereby disposing said central tube at said separated position.

2. The tripod assembly according to claim 1, wherein said tube connector has an outer peripheral wall surrounded with three L-shaped fasteners, which cooperatively define said first fastening element and which are spaced from one another at equal distance with respect to an axis of said outer peripheral wall so as to define a first reception space between an adjacent pair of said L-shaped fasteners, each of said L-shaped fasteners further defining an entrance, wherein said lower tripod unit has an inner peripheral wall that confines said opening and that is formed with three I-shaped fasteners cooperatively defining said second fastening element, wherein said three I-shaped fasteners are spaced from one another at equal distance with respect to an axis of said lower tripod unit so as to define a second reception space between an adjacent pair of said I-shaped fasteners for receiving said L-shaped fastener while said first reception space receives a respective one of said I-shaped fasteners such that rotation said central tube in said clockwise direction relative to said lower tripod unit results in insertion of said I-shaped fastener into said L-shaped fastener via said entrance, thereby engaging said first fastening element of said central tube with said second fastening element of said lower tripod unit so as to prevent separation of said central tube from said lower tripod unit.

3. The tripod assembly according to claim 2, wherein said I-shaped fastener has a position retaining protrusion at an appropriate position while said L-shaped fastener has a position retaining groove corresponding to said position retaining protrusion such that rotation of said central tube relative to said lower tripod unit in said clockwise direction results in insertion of said I-shaped fastener into said L-shaped fastener, thereby causing mutual engagement between said position retaining protrusion of said I-shaped fastener and said position retaining groove of said L-shaped fastener and enhancing engagement of said central tube relative to said lower tripod unit.

* * * * *